(No Model.) 3 Sheets—Sheet 1.

J. B. LIVINGSTON.
ARMATURE FOR DYNAMO ELECTRIC MACHINES.

No. 250,554. Patented Dec. 6, 1881.

WITNESSES:
C. Neveux
C. Sedgwick

INVENTOR:
J. B. Livingston
BY Munn & Co
ATTORNEYS.

(No Model.) 3 Sheets—Sheet 2.

J. B. LIVINGSTON.
ARMATURE FOR DYNAMO ELECTRIC MACHINES.

No. 250,554. Patented Dec. 6, 1881.

WITNESSES:
C. Neveux
O. Sedgwick

INVENTOR:
J. B. Livingston
BY Munn & Co
ATTORNEYS.

(No Model.) 3 Sheets—Sheet 3.

J. B. LIVINGSTON.
ARMATURE FOR DYNAMO ELECTRIC MACHINES.

No. 250,554. Patented Dec. 6, 1881.

WITNESSES:
C. Neveux
C. Sedgwick

INVENTOR:
J. B. Livingston
BY Munn & Co
ATTORNEYS.

UNITED STATES PATENT OFFICE.

JAMES B. LIVINGSTON, OF NEW YORK, N. Y.

ARMATURE FOR DYNAMO-ELECTRIC MACHINES.

SPECIFICATION forming part of Letters Patent No. 250,554, dated December 6, 1881.

Application filed March 11, 1881. (No model.)

*To all whom it may concern:*

Be it known that I, JAMES B. LIVINGSTON, of the city, county, and State of New York, have invented a new and Improved Armature for Dynamo-Electric and Magneto-Electric Machines, of which the following is a specification.

Figure 1:
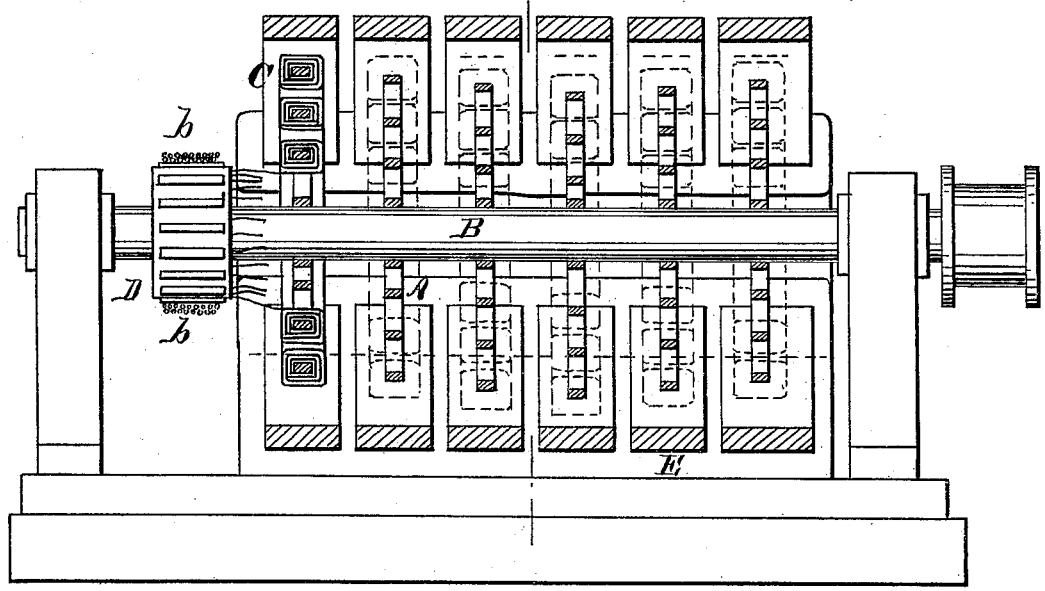
Figure 2:
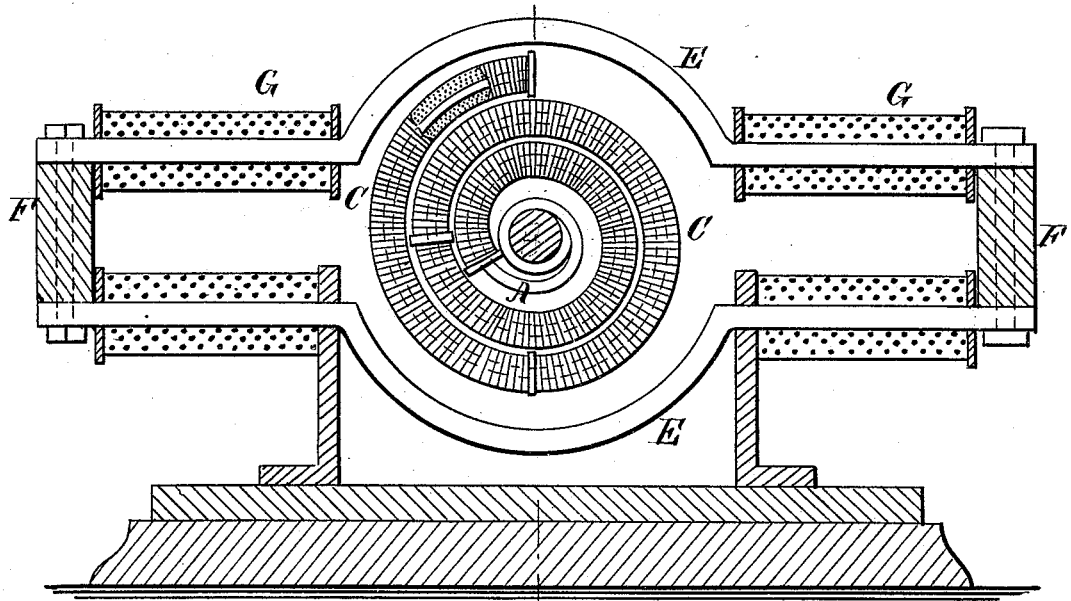

Figure 1 is a vertical transverse section of a dynamo-electric machine, taken through the axis of the armature and on line $x\ x$ in Fig. 2. Fig. 2 is a vertical longitudinal section of a dynamo-electric machine, showing one of the coils of the armature. Figs. 3 to 8, inclusive, represent various methods of arranging the armature-cores all under the same general plan.

Similar letters of reference indicate corresponding parts.

My invention relates to the armature of dynamo-electric and magneto-electric machines; and it consists, essentially, in an armature of spiral or volute form, wound with wires or other electrical conductors having their plane of convolution at right angles to the plane of rotation of the spiral.

The object of the invention is to increase the length of the body of iron composing the core of the armature without increasing the diameter or axial length of the armature, so that a single core may be divided up into a number of poles and nodal points, to secure currents of different potential by connecting the bobbins with each other and with the commutator in different ways.

Figure 3:
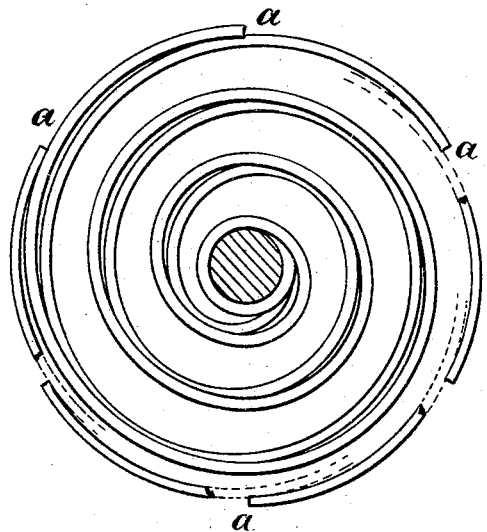
Figure 4:
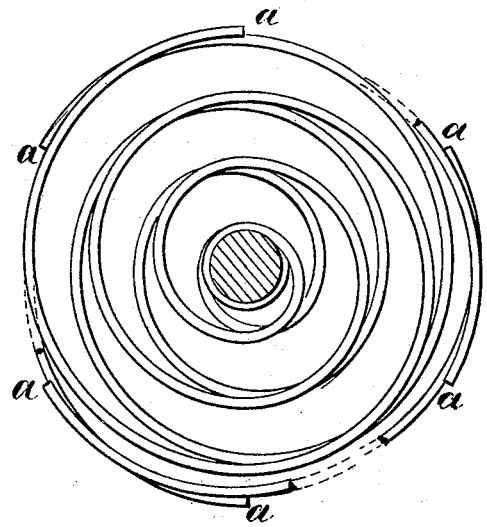

The fundamental principle of my invention is illustrated by Figs. 1 and 2, in which a series of iron spiral armature-cores, A, are attached to the shaft B, and are arranged relatively to each other so that their outer or free ends terminate at equally-distant points in an imaginary cylinder, of which the shaft B is the axis. This arrangement of spiral armature-cores is shown in Fig. 3, $a\ a\ a$, &c., being the terminals of six armature-cores, which is the number used in the present case, although either a greater or less number may be employed. The spiral cores are wound transversely with insulated copper wire—that is, to and fro in a plane at right angles to the plane of rotation of the armature. The winding is preferably divided up into separate bobbins C covering the spiral armature-core A from the extreme outer end to the fastening of the core on the shaft B; or the winding may consist of a single bobbin, covering the armature-core either partly or wholly. The terminals of each bobbin C are connected with copper bars on diametrically-opposite sides of the commutator-cylinder D, and the current is taken off by brushes $b\ b$ of the usual construction.

Where an intense current is required I arrange the armature-cores so that their outer ends all point in one direction, as indicated in Fig. 3; but where a quantity-current is required I arrange the armature-cores so that their outer ends point alternately in opposite directions, as indicated in Fig. 4.

In some instances I make the spiral armature-cores of a flat bar of iron, as in Figs. 1, 2, 3, 4, and 7. In other cases I make them of circular cross-section, as in Figs. 5 and 6; but I do not limit or confine myself to any particular form of bar.

Figures 5, 6:
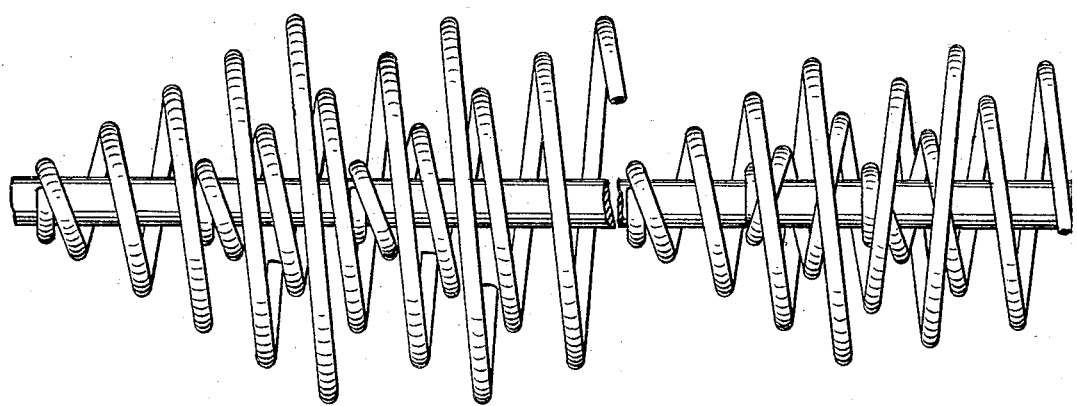

In Fig. 5 I have shown a spiral armature drawn out into conical form. When armatures of this class are employed the first armature of a series partly incloses the second, and the second partly incloses the third, and so on.

By means of this device I am enabled to increase the length of the armature-core.

What has been said in regard to quantity and intensity in the first form of armature described applies equally well to the conical one—that is, the armature-cores all point in one and the same direction, as shown in Fig. 5, when an intensity-current is required, and they point alternately in opposite directions, as shown in Fig. 6, when a quantity-current is required.

Figure 7:
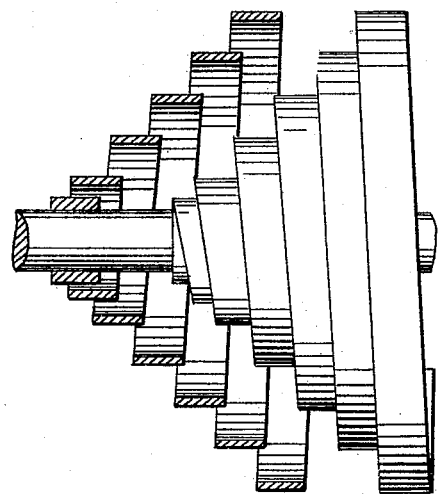
Figure 8:
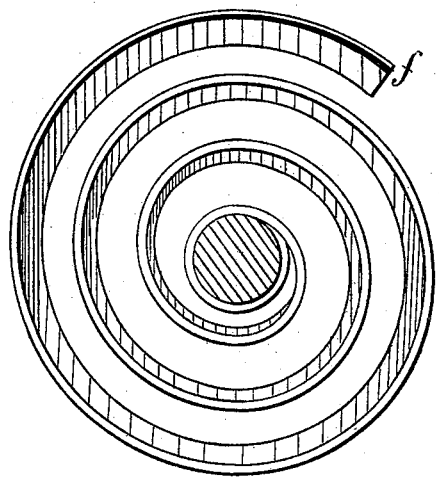

In Fig. 7 I have shown a coned spiral made of a flat bar. The coned spirals are wound with insulated wire in the same manner as the volute spirals shown in Figs. 1 and 2. When the armature-wire tends to heat I twist the ends of the spiral armature-cores so as to form a vane or fan, $f$, as in Fig. 8, capable of drawing air into the armature at one end and discharging it at the other end.

My improved armature, made in either of the forms indicated, is revolved in the field of a powerful electro or permanent magnet. I prefer a magnet of the well-known form shown in Figs. 1 and 2, consisting of the curved bars E, connected at their ends by the yoke-pieces F and surrounded by the magnet-wire G.

Having thus fully described my invention, I claim as new and desire to secure by Letters Patent—

1. In an armature for a dynamo-electric machine, a series of spiral cores having their outer ends arranged at equal distances apart in the circumference of the armature, substantially as specified.

2. In an armature for a dynamo-electric machine, a series of spiral cores having their outer ends pointing alternately in opposite directions, as herein specified.

3. In an armature for a dynamo-electric machine, a series of coned spirals overlapping each other, as herein specified.

4. In a dynamo-electric machine, an armature composed of a series of spiral cores having their ends twisted to form a fan, as herein specified.

JAMES B. LIVINGSTON.

Witnesses:
C. SEDGWICK,
GEO. M. HOPKINS.